July 21, 1964 N. J. SMITH 3,141,335
PRESSURE RELIEF MEANS FOR GAUGES
Filed Jan. 4, 1961
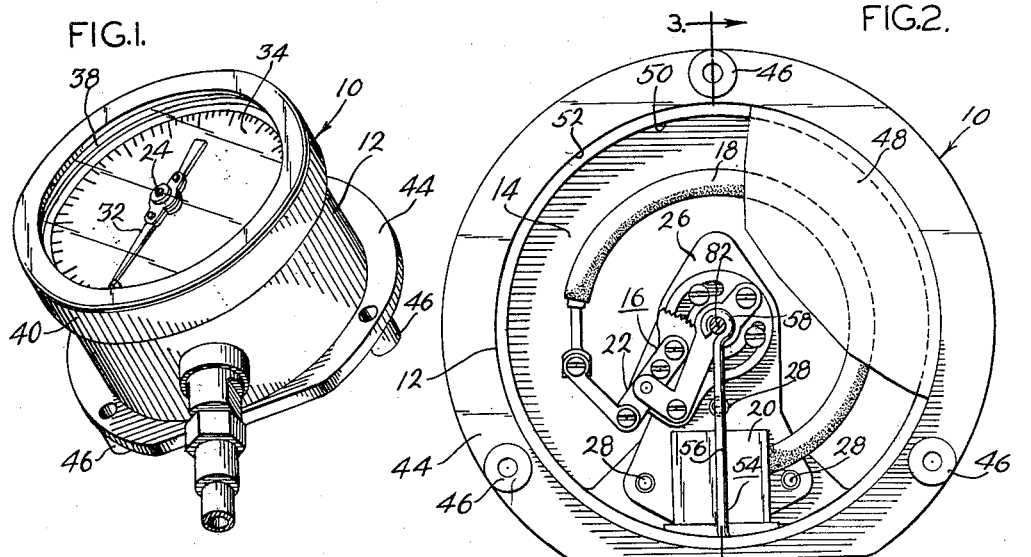
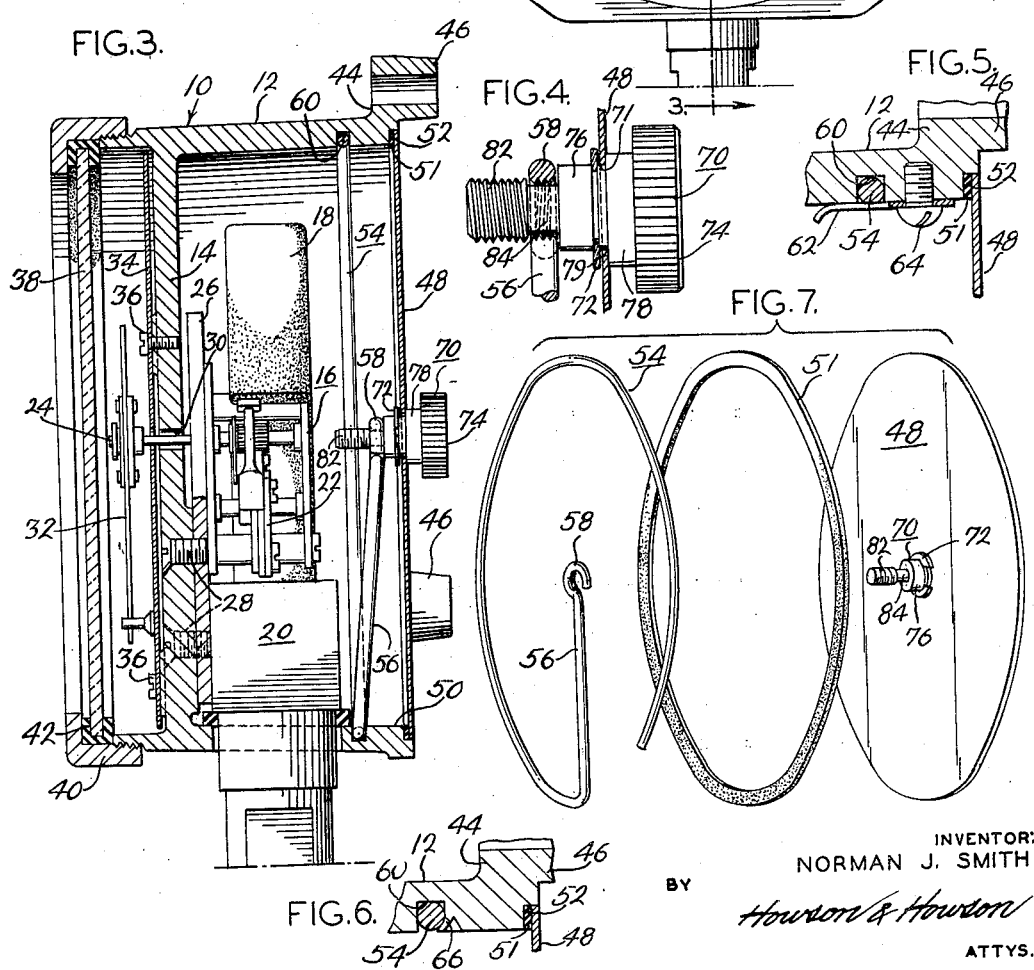
INVENTOR:
NORMAN J. SMITH
BY
Howson & Howson
ATTYS.

United States Patent Office 3,141,335
Patented July 21, 1964

3,141,335
PRESSURE RELIEF MEANS FOR GAUGES
Norman J. Smith, Churchville, Pa., assignor to J. E. Lonergan Company, Philadelphia, Pa., a corporation of Pennsylvania
Filed Jan. 4, 1961, Ser. No. 80,673
2 Claims. (Cl. 73—416)

The present invention relates to new and useful improvements in pressure gauges. More particularly, the present invention relates to a casing for pressure gauges having pressure relief means for immediately venting the interior thereof to atmosphere when the pressure in the casing exceeds a predetermined amount.

An object of the present invention is to provide a casing including a cover plate as part thereof, which is immediately responsive to excessive pressures in the casing to relieve the same, whereby the risk of injury to persons in the vicinity of the gauge in the event of an explosion, is reduced.

Another object of the present invention is to provide a casing of the above type which is of simplified construction, which may be manufactured easily and economically, and which is fully effective in operation and use.

Other objects of the present invention and the various features and details of the operation and construction thereof are set forth more fully hereinafter with reference to the accompanying drawing, in which:

FIG. 1 is a perspective view of a gauge made in accordance with the present invention;

FIG. 2 is an elevational view of the gauge of FIG. 1, with portions broken away to show its construction;

FIG. 3 is an enlarged sectional view taken on line 3—3 of FIG. 2;

FIG. 4 is a view showing the fastening member for retaining the blowout plate in position on biasing means in the casing;

FIG. 5 is an enlarged fragmentary sectional view showing means for retaining the blowout plate biasing means in the casing.

FIG. 6 is an enlarged fragmentary sectional view, showing another form of biasing means retainer, and FIG. 7 is an exploded perspective view of the blowout plate and biasing means.

Referring to the drawing, the gauge 10 comprises a generally cylindrical casing or housing 12 having a front wall 14 formed integrally with the side wall and spaced axially from the front of the housing, and a gauge movement 16 mounted in the housing. The gauge movement, which is of generally conventional design, consists of a Bourdon tube 18 connected at one end to a nipple 20, and at the other end to a linkage 22 which in turn is connected to an indicator shaft 24. The gauge movement is mounted on a backing plate 26 which is secured to the front wall 14 of the housing by screw fasteners 28. The indicator shaft 24 projects forwardly through an opening 30 in the front wall 14, and supports at its outer end an indicating needle 32 which registers with a dial plate 34 mounted on the front wall 14 by suitable fasteners 36. The indicating needle 32 and dial plate 34 are protected from the surrounding atmosphere by a dial cover glass 38, mounted on the forward part of the housing by a retaining ring 40 and a gasket 42. The housing 12 has a radially projecting annular flange 44 extending outwardly from the rear portion thereof with a plurality of circumferentially-spaced, axially-projecting feet 46 thereon for mounting the gauge 10 in spaced relation on a panel or similar installation.

In accordance with the present invention, pressure relief means is provided in the housing to relieve the pressure therein in the event of an explosion or other rupture of the Bourdon tube 18, causing an increase in pressure in the housing. To this end a rear cover plate 48 is provided, which is mounted over the opening 50 in the rear of the housing for movement between a seated position closing the opening to seal the interior of the housing from the atmosphere, and an unseated position providing a clearance between the cover plate and housing to vent the housing to the atmosphere upon excessive pressure build-up in the housing. In the present instance, the cover plate 48 is of generally disc-like form, and normally is seated on an annular sealing element 51 mounted in an annular seat 52 formed in the housing surrounding the opening 50. Biasing means is provided to normally maintain the cover plate 48 in engagement with the annular sealing element 51 to seal the interior of the housing. Upon a predetermined pressure increase in the housing, the cover plate 48 is moved axially outwardly from the housing against the urging of the biasing means to thereby vent the interior of the housing to atmosphere. The biasing means consists of a resilient wire 54, bent into an annulus, having an inwardly projecting radial arm 56 which terminates in an internally threaded loop 58 at approximately the center of the annulus. The wire 54 is positioned in an annular groove 60 formed on the interior side wall of the housing, and is of a slightly greater diameter than the diameter of the groove, so that it is under a slight radial pressure, thereby retaining it in the groove 60. If desired, however, as shown in FIG. 5, movable straps 62 may be secured to the housing by screws 64 to retain the wire 54 in the groove 60. Alternatively, as shown in FIG. 6, the wire 54 may be retained in the groove 60 by detents 66 formed by upsetting the housing wall at points around the groove 60.

The cover plate 48 is secured to the threaded loop 58 of the wire 54 by means of a fastener 70 which may be removably secured in an opening 71 in the cover plate 48 by means of a clip or split ring 72 which permits rotational movement of the fastener in the opening. The fastener 70 is a screw type having an enlarged head 74, a pair of stepped cylindrical portions 76 and 78 extending from the head portion, and a shank 82 extending from the cylindrical portion 76 which is threaded for the major part of its length. The threaded portion of the shank 82 is spaced from the cylindrical portion 76 to provide a reduced neck portion 84. The opening 71 in the cover plate is slightly greater in diameter than the cylindrical portion 76 and smaller than the cylindrical portion 78 of the fastener, so that the fastener may be inserted in the opening, as shown in FIGS. 3 and 4, with the shoulder 79 confronting the rear or outer face of the cover plate 48. The clip 72 engages in a groove adjacent the shoulder 79 to confront the front or inner face of the cover plate and rotatably mount the fastener in the opening 71.

The cover plate 48 is secured in place over the opening 50 in the rear of the housing by threading the threaded shank 82 of the fastener 70 into the loop 58 until the loop bottoms out in the neck portion 84. This causes the arm 56 to be flexed rearwardly at a slight angle, and the cover plate 48 to be drawn into sealing contact with the sealing ring 51 on the annular seat 52 in the rear of the housing. In the event of a rupture of the Bourdon tube creating an increased pressure in the housing, the rear cover plate 48 immediately responds to the condition and is moved outwardly of the housing against the bias of the arm 46 to permit venting of the housing to atmosphere for relieving the excessive pressure caused by the rupture. The displacement of the plate is limited by the biasing action of the arm 56 to provide a small clearance between the cover plate 48 and the periphery of the opening 50 in the housing. This clearance is large enough to permit the force of an explosion to be vented immediately, and small enough to confine the rearward force of the rupture against the cover plate 48, thereby preventing debris from being discharged from the housing and causing injury to persons in the vicinity, or damage to other nearby equipment. When the excessive pressure has been vented the arm 56 returns the rear cover plate 58 to its seated position.

The rear cover plate 48 may be removed easily and quickly when access to the housing is desired to adjust the gauge movement or replace damaged parts. This is done by merely rotating the fastener 70 to release the plate from the arm 56. The wire 54 also may be removed if desired, or rotated in the housing if necessary to permit access to the parts of the gauge movement which are to be adjusted or replaced.

Accordingly, it is apparent that the present invention provides an improved casing for pressure gauges including a cover plate as part thereof which is immediately responsive to excessive pressures in the casing to relieve the same. The parts comprising the casing of the present invention are comparatively few, and the construction is very simple, so that the casing may be manufactured easily and economically.

While a particular embodiment of the present invention has been illustrated and described herein, it is to be understood that changes and modifications may be incorporated within the scope of the following claims:

I claim:

1. A pressure gauge comprising a generally cylindrical housing open at one end, a gauge movement including a pressure-sensitive Bourdon tube mounted within said housing, a cover plate of generally disc-like form mounted in said housing and movable between a seated position closing the open end of said housing to seal the interior thereof from the atmosphere and an unseated position exposing said open end for venting the interior of said housing to the atmosphere, means defining an annular groove on the inner peripheral surface of said housing, biasing means in said housing operable to normally retain said plate in the seated position, and operable in response to excessive pressures in said housing to permit movement of said cover plate to said unseated position, said biasing means consisting of a resilient annulus mounted in said annular groove having a radially inwardly-projecting arm with its terminal end at approximately the center of said annulus, means defining an internally-threaded opening in said terminal end, and a fastener connected to said cover plate having a threaded portion engageable within said threaded opening in said terminal end operable to flex said arm toward said cover plate and thereby urge said cover plate to said seated position.

2. A gauge according to claim 1, wherein said fastener comprises an enlarged head, a threaded shank portion extending from said head portion and axially spaced therefrom to provide a reduced neck portion, said threaded shank adapted to be received in said threaded opening of said terminal end and upon rotation of said fastener in one direction operable to position said terminal end in said reduced neck portion and thereby flex said arm rearwardly toward said cover plate.

References Cited in the file of this patent

UNITED STATES PATENTS

| | | |
|---|---|---|
| Re.14,339 | Schubert | July 25, 1916 |
| 2,672,153 | Kipp | Mar. 16, 1954 |